Dec. 16, 1969  C. J. KOESTER  3,484,710
LASER AMPLIFIERS
Filed Oct. 18, 1965
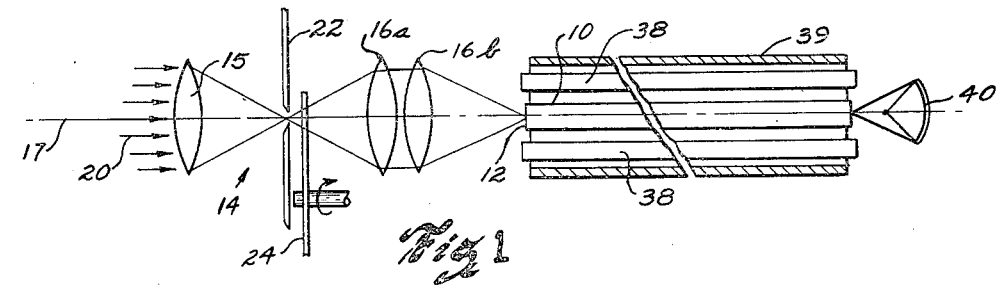
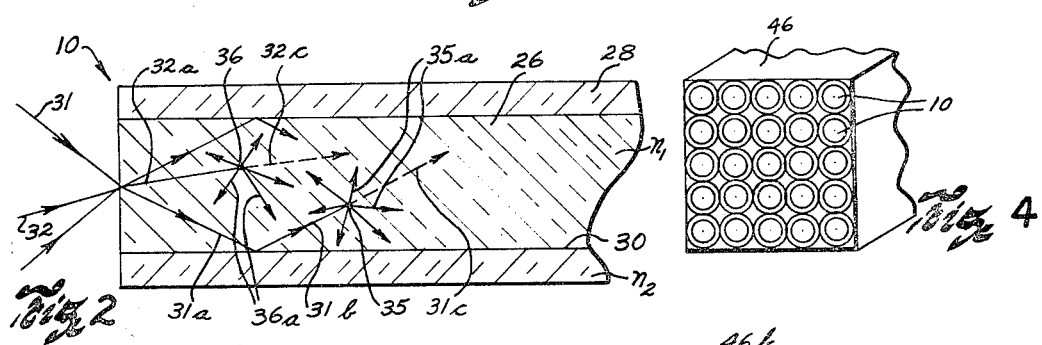
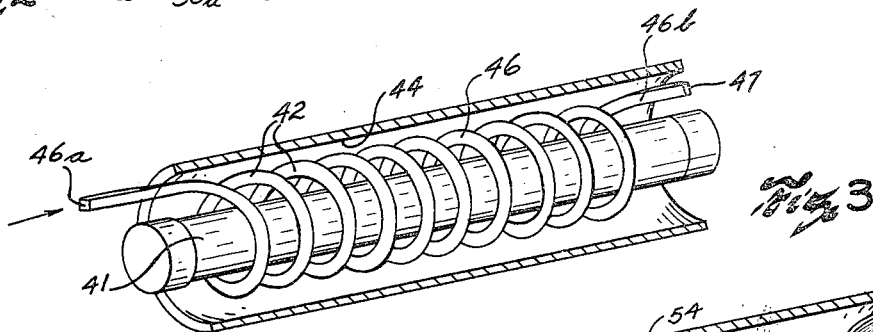
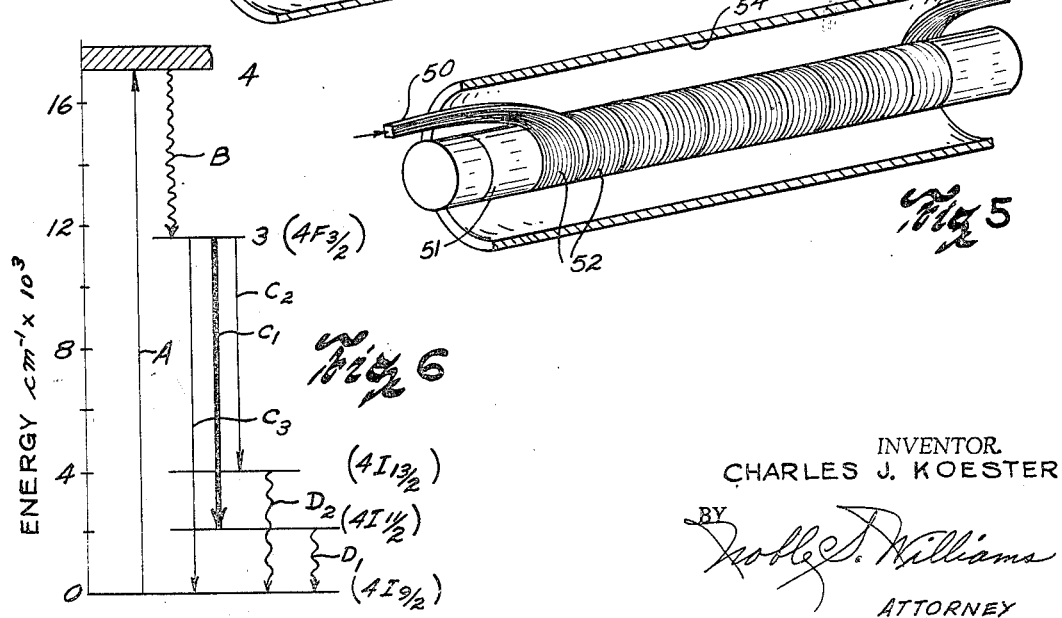
INVENTOR.
CHARLES J. KOESTER
BY Noble J. Williams
ATTORNEY 3,484,710
LASER AMPLIFIERS
Charles J. Koester, South Woodstock, Conn., assignor, by mesne assignments, to American Optical Corporation, a corporation of Delaware
Filed Oct. 18, 1965, Ser. No. 497,033
Int. Cl. H01s 3/00
U.S. Cl. 330—4.3          12 Claims

ABSTRACT OF THE DISCLOSURE

Apparatus for receiving and amplifying optical energy of a visible wavelength and very small intensity from a star or other very remote object including light-collecting optical system of very high numerical aperture value in optical alignment with at least one thin elongated laser component, said component having a large acceptance angle and comprising a thin fiber core of laser material surrounded by transparent cladding, the laser core being at least many hundreds of times greater in length than the transverse diameter thereof.

---

This invention relates to apparatus for use in amplifying optical energy. More particularly, it relates to laser apparatus for use in amplifying optical energy of wavelengths within the visible portion of the electromagnetic spectrum, and particularly wherein the energy of the input beam or signal is of low, or even very low, intensity as, for example, a beam of white light or the like coming from a star, a communications satellite or other distant object.

More specifically, the apparatus of the present invention comprises means in the form of an optical system for collecting as much optical energy coming from the distant object as is conveniently possible and for concentrating or focusing this energy into a small beam or optical image of greatly increased intensity, means in the form of one or a plurality of like thin elongated fiber laser components of special construction and arranged so as to receive, through the optically finished entrance end surface thereof, as much of the optical energy of this beam or signal as possible, light source means suitably positioned so as to efficiently optically pump said thin elongated laser component or components, and photosensitive means or the like arranged in closely adjacent aligned relation to the finished exit end surface of said component or components for receiving an amplified output beam or signal of a predetermined laser emission wavelength therefrom; and which output is, in fact an amplified version of the input beam or signal being received by said apparatus.

Additionally, each thin elongated fiber laser component, which may be employed singly or collectively in a bunched formation, is formed by a transparent core of a moldable active laser material having a relatively high refractive index and by a cladding of moldable transparent material having a lower refractive index arranged in surrounding contacting relation with the side wall portions of said core. Further, each such laser component is carefully formed so as to insure that the core portion thereof is as free as possible from bubbles, inclusions and the like, and that the adjacent contacting side wall portions of the core and cladding are as optically smooth and even and well formed as possible. The reasons for desiring such conditions for each laser component are to insure homogeneity throughout the length of the core and to insure that the optical interface formed between side wall portions of the core and cladding will provide as high and uniform conditions for total internal reflection as possible. Also, each component is provided at least at its entrance end with an optically finished end surface so that as much of the available optical energy of the input beam or signal as possible will be refracted into the laser core.

Thus, not only is a high-speed optical system provided for gathering as much available light from a distant object as possible, but also as much of this input optical energy as possible is directed and refracted into the core portions of the component or components through the entrance surface thereof, and thereafter substantially all of this input optical energy within each core will be totally internally reflected at the interface thereof so as to be retained within the core as it travels down the core and is gradually absorbed by the laser core material. Thus, as much of the input energy as possible is made available for conversion into the fluorescent wavelength of the laser material; as will be more fully explained hereinafter.

It is, accordingly, an object of the present invention to provide apparatus for converting optical energy of a given range of wavelengths (as, for example, a range within the visible portion of the electromagnetic spectrum) into energy at a different wavelength suitable for laser amplification and, particularly, wherein such optical energy is an input beam or signal of low, or very low, light intensity.

The word "light" as here used as well as throughout the instant specification is intended to include optical energy not only within the visible region of the spectrum but the infra-red and ultra-violet as well.

It is also an object of the invention to provide apparatus of the character described comprising one or more thin elongated fiber laser components arranged to receive the optical energy of an input beam or signal and to amplify this beam or signal in such a manner that monochromatic optical energy at a predetermined laser emission wavelength, and which is, in effect, an amplified version of the input optical signal, will be produced by the apparatus during optical pumping thereof.

It is also an object of the invention to provide apparatus of the character described comprising a very large number of thin elongated fiber laser components in like side-by-side bunched relation at least at the opposite ends of the bundles formed thereby, and wherein each component of said bundle comprises a core of active laser material surrounded by a transparent cladding of optical material of sufficient thickness to optically isolate one core from another, an optical system for directing a beam of optical energy from a distance object into the finished entrance end of said bundle, means for optically pumping said bundle, and photosensitive means operatively associated with the exit end of said bundle whereby light imaged by said optical system upon the entrance end of said bundle will enter the laser core material forming each component and will be absorbed and converted thereby into fluorescent light which will then travel down the fibers and will be amplified by the portions of the fibers being optically pumped. Thus, collectively, said components will provide an amplified optical image corresponding to the input light beam being received at the opposite end thereof. Additionally, means may be provided for chopping or interrupting a steady input optical signal, when desired.

Other objects and advantages of the invention will become apparent from the detailed description which follows when taken in conjunction with the accompanying drawings in which:

FIG. 1 is a diagrammatic longitudinal sectional view of light-amplifying apparatus embodying the present invention;

FIG. 2 is an enlarged longitudinal sectional view of a portion of a single laser component which may be employed in the apparatus of FIG. 1;

FIG. 3 is a perspective view, partly in section, of an optical image-amplifying apparatus embodying the present invention;

FIG. 4 is an enlarged cross-sectional view of a bundle of components such as might be used in FIG. 3;

FIG. 5 is a perspective view, partly in section, showing a modified form of optical image-amplifying apparatus embodying the present invention; and FIG. 6 is an energy level diagram for a moldable laser material which may be employed in apparatus for carrying out the present invention.

Referring to the drawing in detail and in particular to the apparatus of FIG. 1, it will be seen that the numeral 10 indicates a thin elongated fiber laser component, into the optically finished entrance end 12 of which may be directed a concentrated beam or signal of visible optical energy by a light-collecting optical system generally indicated by the numeral 14. In the present instance, this optical system comprises a telescopic lens 15 and a pair of convergent lenses 16a and 16b which are aligned along an optical axis 17 so as to receive substantially parallel light rays 20 coming from a star or other distant object and being converged by lens 15 to a first focus substantially at the plane of an apertured diaphragm and thereafter, these light rays are re-imaged by lenses 16a and 16b upon the entrance end surface 12 of the laser component 10. In this manner, substantially only the well focused light rays coming directly from the distant object will be allowed to pass through the aperture in diaphragm 22 and thereafter reach the entrance end surface 12. Also in certain cases when desired, it is possible, as indicated by numeral 24, to provide a motor-driven rotatable chopper wheel of known kind and disposed closely adjacent the plane of the aperture stop 22 so that the incoming light beam or optical signal will be interrupted at some desired predetermined frequency. Generally, the electric motor for such a purpose will be of a synchronous type.

As indicated in greater detail in FIG. 2, component 10 comprises a thin elongated fiber optical core 26 and a cladding 28 arranged in surrounding contacting relation with side wall portions of said core in such a manner as to have good smooth continuous optical contact therewith and thus form an optical interface 30 of high uniform quality. The core 26 may be formed of a transparent moldable active laser material of relatively high refractive index $n_1$ and the cladding 28 may be formed of a transparent moldable material of relatively lower refractive index $n_2$.

A suitable core material would be a 6 percent trivalent neodyminum doped flint glass which has a refractive index $n_1$ of approximately 1.70 and a suitable material for the cladding would be a soda-lime crown glass which has a refractive index $n_2$ in the neighborhood of 1.52. Thus, a refractive index difference of relatively large value would be provided at the interface 30 by the use of these two glasses. The ratio, $\gamma$, of the fractional amount of light trapped within the core to that emitted by spontaneous emission is given by the following:

$$\gamma = \frac{n_1 - n_2}{n_1} \quad (1)$$

This expression makes it evident that core and cladding glasses with the highest possible index difference should be chosen.

Another laser glass, but of a somewhat lower refractive index value is a 5% neodyminum doped barium crown glass. Holmium-doped silicate glasses as well as erbium-ytterbium doped silicate and borate glasses are also useful as core materials for the purposes of the present invention, although the neodymium-doped flint laser glass is preferred because of its relatively high refractive index.

It is desirable for carrying out the invention that the numerical aperture, N.A., of the optical system focusing and directing the input light beam or optical signal into said laser core be as high as is conveniently possible, up to the N.A. of the fiber laser, since, in many cases, such as a beam or signal coming from a star or other distant object will be of a relatively low or weak intensity. Also, it is desirable that this optical energy which enters the laser core 26 be utilized as efficiently as possible. Accordingly, a core of high refractive index and a large refractive index difference at the optical interface 30 be provided. When such is the case, essentially all the light which enters the core will be trapped, that is, prevented from escaping through the side wall interface 30, but instead will be retained within the core by total internal reflection and will travel within the core until it is either absorbed or leaves the opposite end of the fiber component.

Since the active ingredient contained in the fiber laser core material as a doping agent, such as the trivalent neodymium in the flint glass, is a fluorescent material having characteristic strong absorption bands within predetermined visible wavelength regions of the optical spectrum, light from the distant object which enters the end of the core will be absorbed as it propagates down the core. As this happens, this energy will be converted into energy at the fluorescent wavelength of the active material.

Thus, as suggested in the diagrammatic showing of FIG. 2, a light ray within a suitably directed bundle of entering light rays, such as ray 31 (or 32) upon entering the core 26, will be refracted and will travel, as indicated at 31a and 31b (or at 32a and 32c), within the core until it is absorbed. Of course, such a ray within the core may experience total internal reflection a number of times at the interface 30 before being completely absorbed. Dotted lines 31c and 32c are intended to suggest light rays which have been partially absorbed.

However, when active ions within the laser material are activated by the energy of these light rays, as, for example, at points 35 and 36, this energy will be converted into energy at the characteristic fluorescent wavelength of the active material, and the spontaneously emitted energy thus produced will travel in various directions from points 35 and 36, as suggested by the randomly directed small arrows 35a and 36a radiating outwardly therefrom. Because of the large refractive index difference provided at the interface 30, a substantial fraction of this spontaneously emitted flourescent energy, likewise, will be so directed as to be trapped by total internal reflection within the core and made to travel longitudinally of the core. The fraction, $\gamma$, is given by Equation 1.

The fraction of the fluorescent light trapped in the core can also be increased by coating the entrance face of the fiber laser with a dielectric multilayer which has high reflectance at the laser wavelength and high transmittance at all of the laser pumping wavelengths. This will cause most of the light which is spontaneously emitted within the core in the direction of the entrance face to be reflected back into the fiber laser core so that it is thereafter amplified.

In FIG. 1, in closely adjacent and circumferentially arranged relation to the thin elongated fiber laser component 10, is shown a plurality of high intensity flash tubes, or the like 38, which serve as the light source for supplying optical energy at the pumping wavelengths of the laser material. In surrounding relation to the laser component and the flash tubes is a reflector 39 which serves to direct pumping light energy received thereby inwardly towards component 10. Since the trivalent neodymium being used as the active ingredient strongly absorbs radiation of wavelength bands in the infra-red, yellow, and blue-green parts of the visible spectrum, the flash tubes 38 will be carefully selected with these conditions in mind.

Since the trivalent neodymium-doped laser glass, for example, is a four-energy level laser material, when optical energy at the pumping wavelengths is provided by the flash tubes 38 absorption of this energy will occur and certain neodymium ions thereof will be raised, as indicated by transition arrow A on the energy level diagram of FIG. 6, from ground state ($4I_{9/2}$) to the excited state or excitation 4. Thereafter, these ions will undergo non-radiative transitions, as indicated by wavy arrow B, as they fall back from the excited state to a metastable state 3. When an inversion of population exists due to the number of active ions in the metastable state 3 exceeding the number of active ions in a termination state ($4I_{11/2}$) by a certain amount, a strong fluorescent transition $C_1$ at the 1.06 micron wavelength between these two energy levels will occur followed by a non-radiative transition $D_1$ to ground level. Also, a lesser fluorescent transition $C_2$ at 1.35 microns between metastable state 3 and terminal state ($4I_{13/2}$) can also occur when a proper inversion of population between these two states occurs, followed by a non-radiative transition $D_2$ to ground level. Likewise, a lesser fluorescent transition $C_3$ at 0.88 micron from metastable state 3 directly to ground level is also possible. However, the 1.06 micron radiation is by far the most important.

In view of the fact that the amount of optical energy entering the core of the laser component 10 from a star or other distant object is relatively very small, it is pointed out that certain conditions should be cared for in the best way possible. The optical system for collecting and directing the input signal into the core should have a high or even very high numerical aperture. The optical system should be well aligned with the axis of the laser component at the end adjacent thereto and the optical system should be correctly focused upon the entrance surface thereof. Even a low reflection coating (not shown) could be evaporated onto the entrance end surface of the component for the purpose of admitting more of the available light.

In this way, the input optical energy will be directed into the core at its highest possible efficiency. Thereafter, as much of this energy as possible should be retained within the core 26 in order that it may be absorbed by the active laser material thereof, and this brought about by having the cladding material surrounding the core in good optical contact therewith and by having as large a refractive index difference as possible between core and cladding; whereby more of the input energy of the beam or signal and also more of the optical energy at the laser emission wavelength will be retained within the core and caused to travel longitudinally thereof. An additional advantage from the use of the cladding material for each laser core is derived from the fact that this cladding is of materially greater diameter than that of the core and thus helps collect and refract more pumping energy centrally toward the core.

While component 10 in FIG. 1 has been shown as being a straight component with no bends therein, it may be more desirable to coil such a component helically about a flash tube or the like. This, it will be appreciated, is readily possible since in one preferred construction a laser component was provided which was 1 meter in length and employed a core of only 10 microns in diameter. This component was provided with a cladding of a suitable thickness to function therewith and thus the finished component could be readily formed into a helical shape. The laser output of such a component, whether straight or coiled, could be collected by a photosensitive element such as the infra-red sensitive photocell shown at 40 in FIG. 1.

Instead of arranging the entrance end surface, or the exit end surface, or both, of the component 10 of FIG. 1 at right angles to the longitudinal axis thereof, it would be possible to provide same with a sloping surface, or surfaces (not shown) each disposed at such an angle as not to so reflect any part of the light travelling within the core of the component and impinging upon the end surface thereof as to travel back down the core. However, at the same time the angle of this sloping surface should not be so great as to have such internally travelling light experience total internal reflection at said end surface. In this way, by the use of one or two sloping end surfaces, greater amplification of the signal will be possible.

In FIG. 3 is indicated a flash tube 41 about which is arranged a long thin bundle of fiber laser components so as to constitute a large number of convolutes 42 in helically arranged relation with respect to said flash tube. Around such an assembly may be used a reflector 44. A cross-section of such a bundle may very well appear like that indicated at 46 in FIG. 4, wherein a large number of such components have been arranged in closely bunched generally parallel side-by-side relation to each other throughout their lengths. The entrance end 46a of such a bundle would, of course, be carefully arranged in optical alignment with an optical system like that shown in FIG. 1 and so as to have the image of a distant object being formed by said system impinge upon the optically finished entrance surface thereof. The exit end 46b of such a bundle, on the other hand, may very well be provided with a suitable fluorescent screen or other photosensitive means 47, whereby an amplified laser signal provided by each laser component, as for example, at a infra-red laser emission wavelength of 1.06 microns, will jointly display an amplified visible optical image thereon.

In a somewhat similar arrangement in FIG. 5, is shown a bundle of fiber laser components 50 but, instead of this bundle having substatially the same cross-sectioal configuration at all sections along its length, the bundle may be easily formed by known methods so that the components thereof at their opposite ends are secured together in like geometric arrangement but intermediate said ends these components are unsecured relative to one another. The fiber laser bundle of such a construction would then be carefully wrapped, as shown at 52 in FIG. 5, around a flash tube 51 in such a manner that substantially each and every component thereof would be similarly arranged in side-by-side relation to each other and thus all similarly exposed to the pumping optical energy of the flash tube. In this manner, a more uniform pumping of each and every component of the bundle may be effected. Of course, in all cases wherein bundles of components are to be used, the claddings for each individual core should be of sufficient thickness to effect the proper degree of optical insulation required for proper laser operation of the bundle. This assembly, of course, would then be disposed within a suitable reflector 54. The usual electronic components for this flash tube (as well as others in this disclosure) have been omitted in order to simplify the disclosure.

Having described my invention, I claim:

1. Apparatus for receiving and amplifying the optical energy of a light beam of relatively very low intensity being received from a star or other very remote object, said apparatus comprising at least one thin elongated laser component, a light-collecting optical system of relatively very high numerical aperture value so disposed in optical alignment with the entrance end of said component as to be focused at said end and direct said light beam at as high intensity as possible into said entrance end, said component comprising a thin elongated core of transparent active laser material having a relatively high refractive index and smooth continuous side wall portions throughout the length thereof and a cladding of transparent material of a relatively low refractive index disposed in surrounding contacting relation with said side wall portions throughout the length of said core so as to provide a large refractive index difference at the interface therebetween, whereby said component will have a very large acceptance angle for optical energy which will enter said core and be retained by total internal reflection within said core for travel down the length thereof, said laser core being at least many hundreds of times greater in length than the transverse dimension thereof, whereby said light beam of very low itensity will be absorbed by the active laser material of said core and will be converted into spontaneously emitted energy at the fluorescent wavelength of said laser material, and optical pumping means positioned in closely adjacent relation to the side wall portions of said component throughout the greater part of the length thereof for pumping said laser material and spontaneously emitted energy at fluorescent wavelengths which is retained by total internal reflection within said core to an excited state, whereby the light which travels generally longitudinally down the core will be materially amplified.

2. The combination set forth in claim 1 in which the material forming said transparent core and the material forming said transparent cladding are both glasses which may be heated and drawn down simultaneously into an elongated clad fiber laser component of relatively small cross-sectional size.

3. The combination set forth in claim 1 wherein the entrance end surface of said component is optically polished and coated with transparent material of such optical thickness and character as to materially reduce the amount of reflection of input light being directed thereon by said optical system.

4. The combination set forth in claim 1 in which said thin elongated component is of a materially greater length than said flash tube and is helically-shaped intermediate its ends so as to fit closely about said flash tube and position side wall portions thereof in closely adjacent relation thereto.

5. The combination set forth in claim 1 including means in the form of a motor-driven rotatable chopper wheel arranged to intermittently interrupt the light beam being directed by said optical system into said component.

6. The combination set forth in claim 1 in which at least the entrance end of said laser component is sloped relative to a transverse plane through said component at said end, and wherein the angle of slope of said end surface is such that no light which is travelling longitudinally within the core of said component and impinges upon said surface will be so reflected from said surface as to be directed back down said core, nor is the angle of slope of said surface such as to totally internally reflect such light.

7. Apparatus for receiving and amplifying the optical energy of a light beam of relatively very low intensity being received from a star or other very remote object, said apparatus comprising a bundle of thin elongated laser components secured together in like geometric array at least at their opposite ends, a light-collecting optical system of relatively very high numerical aperture value so disposed in optical alignment with the entrance end of said bundle as to be focused at said end and direct said light beam at as high intensity as possible into said entrance end, each component of said bundle comprising a thin elongated core of transparent active laser material having a relatively high refractive index and smooth continuous side wall portions throughout the length thereof and a cladding of transparent material of a relatively low refractive index disposed in surrounding contacting relation with said side wall portions throughout the length of said core so as to provide a large refractive index difference at the interface therebetween, whereby each component of said bundle will have a very large acceptance angle for optical energy which will enter the core thereof and be retained by total internal reflection within said core for travel down the length thereof, each laser core being at least many hundreds of times greater in length than the transverse dimension thereof, whereby said light beam of very low intensity will be absorbed by the active laser material of said cores and will be converted into spontaneously emitted energy at the fluorescent wavelength of said laser material, and optical pumping means positioned in closely adjacent relation to the side wall portions of said bundle throughout the greater part of the length thereof for pumping said laser material of said cores and the spontaneously emitted energy at fluorescent wavelength which is being retained by total internal reflection within said cores to an excited state, whereby the light which is traveling generally longitudinally down the cores will be materially amplified.

8. The combination as set forth in claim 7 wherein that portion of said bundle intermediate the opposite ends thereof is formed into a helical shape about said optical pumping means.

9. The combination as set forth in claim 7 wherein at least the entrance end of said bundle is so sloped as to increase the amplification factor of said bundle.

10. The combination as set forth in claim 7 wherein the entrance end surface of said bundle is optically polished and provided with a coating of transparent material of such a characteristic as to increase the amount of light focused thereon by said optical system, which is transmitted through said surface.

11. The combination set forth in claim 1 wherein the entrance end of the fiber laser component is provided with a multilayer of dielectric material of such a character as to provide increased transmission for optical energy at the wavelengths of the input light beam and to provide increased reflectance for optical energy at the laser emission wavelength.

12. The combination set forth in claim 7 wherein the entrance end of the fiber laser bundle is provided with a multilayer of dielectric material of such a character as to provide increased transmission for optical energy at the wavelengths of the input light beam and to provide increased reflectance for optical energy at the laser emission wavelength.

References Cited

UNITED STATES PATENTS 3,142,760   7/1964   Iams _____ 250—213

OTHER REFERENCES

Lanczi, "Applied Optics," February 1965, p. 255.

JOHN KOMINSKI, Primary Examiner

D. R. HOSTETTER, Assistant Examiner

U.S. Cl. X.R.

250—213